United States Patent
Ramos et al.

(10) Patent No.: US 7,808,941 B2
(45) Date of Patent: Oct. 5, 2010

(54) DYNAMIC ADAPTATION FOR WIRELESS COMMUNICATIONS WITH ENHANCED QUALITY OF SERVICE

(75) Inventors: Naomi Ramos, La Jolla, CA (US); Debashis Panigrahi, La Jolla, CA (US); Sujit Dey, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 646 days.

(21) Appl. No.: 11/718,323

(22) PCT Filed: Oct. 28, 2005

(86) PCT No.: PCT/US2005/039033

§ 371 (c)(1),
(2), (4) Date: Oct. 5, 2007

(87) PCT Pub. No.: WO2006/050140

PCT Pub. Date: May 11, 2006

(65) Prior Publication Data

US 2008/0095124 A1    Apr. 24, 2008

Related U.S. Application Data

(60) Provisional application No. 60/623,725, filed on Oct. 28, 2004.

(51) Int. Cl.
*H04B 7/00* (2006.01)
(52) U.S. Cl. ...................................................... 370/310
(58) Field of Classification Search ......... 370/229–234, 370/310, 328, 329, 431–437, 464, 465; 709/227–229
See application file for complete search history.

(56) References Cited

U.S. PATENT DOCUMENTS

| | | | | |
|---|---|---|---|---|
| 6,961,311 | B2 * | 11/2005 | Rakotoarivelo et al. | 370/238 |
| 7,328,026 | B2 * | 2/2008 | Gu et al. | 455/452.1 |
| 7,525,915 | B2 * | 4/2009 | Zaki et al. | 370/235 |
| 7,684,333 | B1 * | 3/2010 | Dasylva et al. | 370/235.1 |
| 2002/0071449 | A1 * | 6/2002 | Ho et al. | 370/447 |
| 2002/0120740 | A1 | 8/2002 | Ho et al. | |
| 2002/0122409 | A1 | 9/2002 | Kandala et al. | |
| 2003/0161340 | A1 | 8/2003 | Sherman et al. | |
| 2005/0122935 | A1 * | 6/2005 | Mangin et al. | 370/329 |

(Continued)

FOREIGN PATENT DOCUMENTS

EP    1324547    7/2003

(Continued)

OTHER PUBLICATIONS

Japanese Patent Office, Japanese Application No. 2007-532701, filed Oct. 23, 2005, in Office Action Mailed Nov. 24, 2009, 6 pages, to be published by the USPTO.

(Continued)

Primary Examiner—Dmitry H Levitan
(74) Attorney, Agent, or Firm—Perkins Coie LLP

(57) ABSTRACT

Techniques and systems designed to dynamically control communications between wireless devices and an access point in a wireless local area network (WLAN) to enhance the quality of service (QoS). Described techniques and systems may be implemented to further enhance QoS in WLANs under IEEE 802.11e.

23 Claims, 9 Drawing Sheets

U.S. PATENT DOCUMENTS

| | | | |
|---|---|---|---|
| 2005/0135284 A1* | 6/2005 | Nanda et al. | 370/294 |
| 2006/0009229 A1* | 1/2006 | Yuan et al. | 455/452.1 |
| 2006/0062189 A1* | 3/2006 | Takeuchi | 370/338 |

FOREIGN PATENT DOCUMENTS

| | | |
|---|---|---|
| EP | 1631012 | 3/2006 |
| JP | 05048610 U | 6/1993 |
| JP | 2000253017 A | 9/2000 |
| JP | 2004248175 A | 9/2004 |
| JP | 2004297117 A | 10/2004 |
| WO | WO 2006/050140 | 5/2006 |

OTHER PUBLICATIONS

English language translation of Japanese Patent Office, Japanese Application No. 2007-532701, filed Oct. 23, 2005, in Office Action Mailed Nov. 24, 2009, 8 pages, to be published by the USPTO.

International Search Report and Written Opinion mailed on Jun. 21, 2006, for PCT/US05/39033, international filing date Oct. 28, 2005.

International Preliminary Report on Patentability mailed on May 10, 2007, for PCT/US05/39033, international filing date Oct. 28, 2005.

"Video traces for network performance evaluation" at http://trace.eas.asu.edu/tracemain.html (accessed Aug. 10, 2007), 2 pages.

Annese et al., "Providing Delay Guarantees in IEEE 802.11e Networks," Vehicular Technology Conference, 2004. VTC 2004-Spring. 2004 IEEE 59th, vol. 4, pp. 2234-2238, May 17-19, 2004.

Ansel et al., "An efficient scheduling scheme for IEEE 802.11e," in Proc. of WiOpt, Modeling and Optimization in Mobile, Ad Hoc and Wireless Networks (Mar. 2004), 9 pages.

Choi, Sunghyun, Sch. Of Elect. Eng., Seoul Nat. Univ., South Korea, "IEEE 802.11e MAC-level FEC performance evaluation and enhancement," Global Telecommunications Conference, 2002, Globecom '02. IEEE 1: 773-777 (Nov. 17-21, 2002) [Abstract only].

Dong et al., "Improving the aggregate throughput of access points in IEEE 802.11 wireless LANS," In IEEE Workshop on Wireless Local Networks, Bonn, Germany, Oct. 2003, 9 pages.

Garroppo et al., "Admission Region of Multimedia Services for EDCA in IEEE 802.11e Access Networks," Mobile and Wireless Systems, LNCS 3247, pp. 105-120, G. Kotsis and O. Spaniol (Eds.).

IEEE-802.11 WG, "Draft supplement to standard for telecommunications and information exchange between systems—LAN/MAN specific requirements—part 11: MAC enhancements for quality of service (QoS)," IEEE 802.11e Standard Draft/D8.0, 211 pages, Nov. 2005.

Lakshman et al., "VBR video: Tradeoffs and potentials" in Proceedings of IEEE, vol. 86, pp. 952-973 (May 1998).

Mangold et al., "IEEE 802.11e Wireless LAN for quality of service," Proc. European Wireless, Feb. 2002, 8 pages.

Mangold et al., "Analysis of IEEE 802.11e for QoS Support in Wireless LANs," IEEE Wireless Communications pp. 40-50 (Dec. 2003).

Pagtzis et al., Dept. of Comput. Sci., Univ. Coll. London, UK., "On the performance of CFP repetition rate in IEEE 802.11 WLANs supporting IP-mobility," Proceeding. Of the 27th Annual IEEE Conference on Local Computer Networks, (LCN), Nov. 6-8, 2002, pp. 595-597 [Abstract only].

Prado, J. "Mandatory TSPEC parameters and reference design of a simple scheduler," IEEE 802.11-02/705ar0, Nov. 2002; 4 pages + 31 slides.

Ramos et al., "Dynamic Adaptation Policies to Improve Quality of Service of Multimedia Applications in WLAN Networks," ICST/IEEE Intl. Workshop on Broadband Wireless Multimedia, San Jose, CA, Oct. 2004, 10 pages.

Skyrianoglou, D. and N. Passas, "Traffic Scheduling in IEEE 802.11e Networks Based on Actual Requirements," MobileVenue '04 Mobile Location Workshop Athens, Greece, May 2004 http://www.telecom.ece.ntua.gr/mobilevenue04/Papers/Mobile_Venue_04_Skyrianoglou_CR.pdf (5 pages).

Ortega, "Variable Bit Rate Video Coding," *Compressed Video over Networks*, Sun, Ming-Ting and Amy Reibman, Chapter 9, New York: Marcel Dekker, pp. 343-382 (2001).

Wei, Xin, "Analysis of Quality of Service of Wireless LAN for IEEE 802.11e," Undergraduate thesis Y-Level (Information Networks) Linköping University, Department of Electrical Engineering, 90 pages + abstract (Feb. 9, 2004), http://www.diva-portal.org/liu/abstract.xsql?dbid=2154.

Wiethöler, Sven and Christian Hoene, "Design and Verification of an IEEE 802.11e EDCF Simualtion Model in ns-2.26," Technical Report TKN-03-019, Telecommunication Networks Group, Technische Universität Berlin, Nov. 2003 http://net.informatik.uni-tuebingen.de/html/publications/papers/TechReport_03_019.pdf (44 pages).

\* cited by examiner

Figure 3
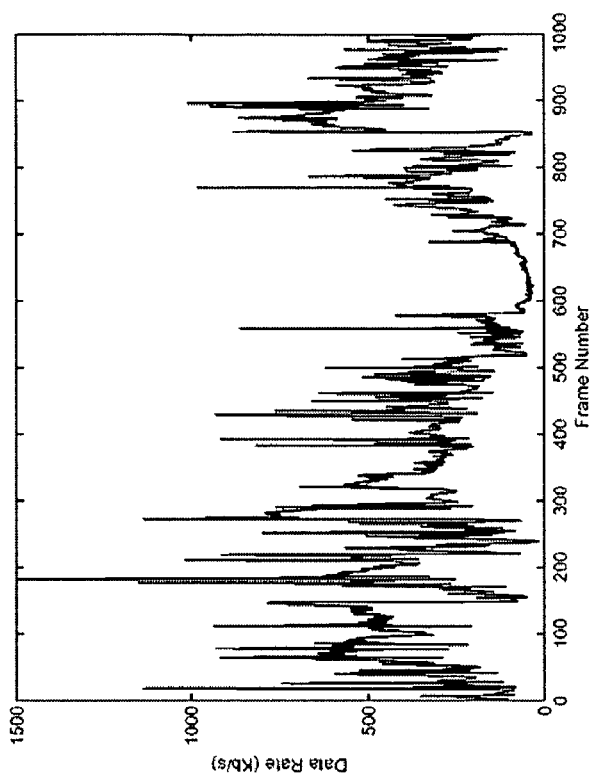
(b) VBR
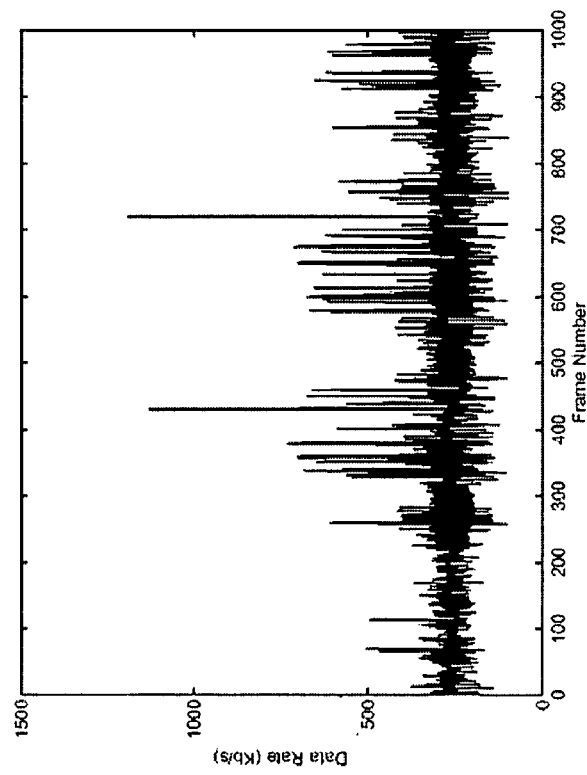
(a) CBR

Figure 7A

```
/* Performed every service interval */
AP_schedule() {
    /*Monitor network conditions*/
    SCHED_EDCA_OK = monitor();
    /*Perform original polling schedule and update stats*/
    original_schedule_poll();
    /*Decide if additional nodes need to be polled*/
    coordinate_hcca_edca(SCHED_EDCA_OK);
}
```

Figure 7B

```
/*Evaluates hcca and edca to determine nodes to adapt*/
coordinate_hcca_edca(SCHED_EDCA_OK) {
    /*Determine leftover space, assume hcca_slack*/
    if (hcca_slack >= avgTXOP) {
        /*First deal with hcca and sort according to weights*/
        /*Returns list of flows needing to be scheduled*/
        sorted_hcca_list = sort_priorities(hcca_flows);
        /*We break if there is no more space and/or
          all the nodes have been satisfied*/
        while (hcca_slack > avgTXOP &&
               sorted_hcca_list != NULL) {
            /*Adds next node in sorted_hcca_list for polling*/
            schedule_hcca_flow(sorted_hcca_list);
            update_hcca_slack();
        }
    }
    /*We check to see if all hcca nodes are finished*/
    if (sorted_hcca_list != NULL) {
        /*Based on load, signal additional flows for EDCA*/
        if (SCHED_EDCA_OK)
            signal_EDCA(sorted_hcca_list);
    }
}
```

Additional Poll List = nodes to poll after scheduled nodes
H2E List = List of HCCA flows allowed/encouraged to transmit in EDCA phase

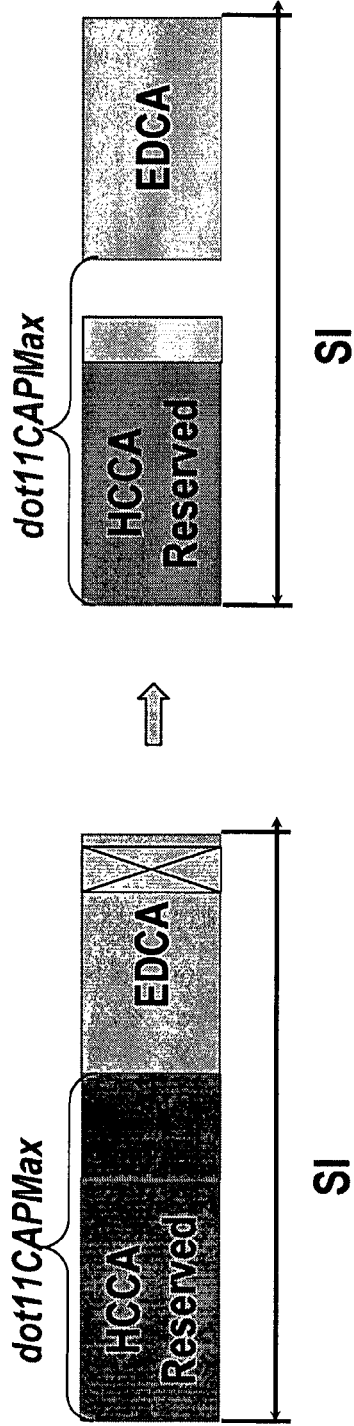
*Figure 11A*
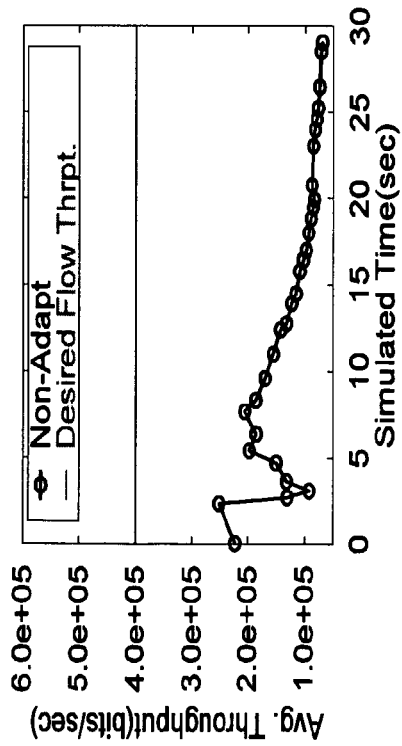
*Figure 11C*
*Figure 11B*

DYNAMIC ADAPTATION FOR WIRELESS COMMUNICATIONS WITH ENHANCED QUALITY OF SERVICE

This application is a national stage application of and claims the benefit of PCT/US2005/039033 filed on Oct. 28, 2005, which claims the benefit of U.S. Provisional Patent Application No. 60/623,725, entitled "Dynamic Adaptation Policies to Improve Quality of Service in IEEE 802.11" filed on Oct. 28, 2004 by Naomi Ramos, Debashis Panigrahi and Sujit Dey. Both applications are incorporated by reference in their entirety as part of the specification of this application.

BACKGROUND

This application relates to wireless communications.

Wireless communication systems use electromagnetic radio waves to provide wireless communication services to wireless communication devices which may also be referred to as wireless nodes or access terminals, such as mobile phones and portable computers equipped with wireless communication ports. Different types of wireless communication systems have been developed to provide different wireless communication applications. A wireless local area network (WLAN) may be designed to use one or more communication devices called access points (APs) as a portal to one or more packet data and other networks and to provide wireless services for mobile and other wireless communication devices (i.e., wireless nodes) in a small geographic area. Each access point has a radio transceiver that covers a limited area called a hot spot or zone within which a wireless device can access wireless services. When multiple wireless devices or nodes access a single access point, the quality of service for different devices or nodes becomes an issue. IEEE 802.11 standards have been widely adopted as one of the communication protocols for WLANs and IEEE 802.11e has features that specifically address the quality of service in WLANs.

WLANs can be used to provide wireless broadband services such as multimedia applications which may include streaming video, teleconferencing, voice over IP and other services. The affordability and improvements to support higher data rates in WLANs have led to a wide spread adoption of WLAN technologies. This can be seen in the proliferation of WLAN networks in homes, offices, and commercial settings, such as airports and restaurants. However, the time-varying nature of wireless access and the diverse requirements of multimedia applications make the task of supporting wireless multimedia services in WLANs challenging. With the increasing demand for broadband services, there is a need to support diverse multimedia services over the wireless medium in a WLAN. Standardization efforts are being pursued to provide Quality of Service (QoS) mechanisms for medium access in WLANs.

IEEE 802.11e is an example of such efforts. As a step towards meeting multimedia application requirements in WLAN networks, the 802.11 Working Group has included in IEEE 802.11e differentiation mechanisms at the Medium Access Control (MAC) layer. See, e.g., IEEE-802.11WG, "Draft supplement to standard for telecommunications and information exchange between systems—LAN/MAN specific requirements—part 11: MAC enhancements for quality of service (QoS)," IEEE 802.11e Standard Draft/D8.0 (February 2004). The IEEE 802.11e standard provides a framework called Hybrid Coordination Function (HCF) that multiplexes between two modes of medium access provided in 802.11e: a distributed access mode under the name of Enhanced Distributed Channel Access (EDCA) and a centralized access mode under the name of Hybrid Coordination Function Controlled Channel Access (HCCA). With the distributed channel access scheme, each flow gains access to the channel through a contention-based algorithm. This method is targeted for bursty traffic flows with unknown traffic requirements. With centralized access, a polling-based scheme is used to grant access to traffic flows based on reservation requests provided by each flow. This scheme is well suited for flows that require guaranteed channel access such as real-time multimedia applications. However, in this scheme, the centralized controller requires accurate information about the flows prior to scheduling, making it more suitable for predictable traffic. The standard also presents a reference design of a scheduler to construct a polling schedule based on the flow requirements specified in the reservation request at initialization. The details of this reference design can be found in J. Prado, "Mandatory TSPEC parameters and reference design of a simple scheduler," IEEE 802.11-02/705ar0, November 2002.

SUMMARY

This application describes, among others, techniques and systems designed to dynamically control communications between wireless devices and an access point in a wireless local area network (WLAN) to enhance the quality of service (QoS). Described techniques and systems may be implemented to further enhance QoS in WLANs under IEEE 802.11e by providing dynamic and adaptive control of medium access via a polling-based centralized medium access mode and a distributed contention-based medium access mode.

One example described in this application is a method for controlling communications in a wireless local area network (WLAN) having an access point as a communication portal and a plurality of wireless communication nodes each wirelessly communicating with the access point. In this method, the access point is operated to receive information about communication flows from the nodes. Selected nodes are assigned, based on nature of communication flows with the selected nodes, with contention-free time periods to allow each selected node to communicate with the access point without contention with other nodes in a corresponding contention-free time period. The remaining nodes are assigned to contend with each other in a time period outside the contention-free time periods and to communicate with the access point. After the assigning, the communication delay buildup in each of the nodes is monitored during communications in assigned time periods to determine whether additional time is needed. Additional contention-free time is allocated to a node needing the additional time when such additional contention-free time is available. When the additional contention-free time is not available, the selected node is then directed to contend with other nodes in communicating with the access point.

In another example, this application describes a method for controlling communications in a wireless local area network (WLAN) in compliance with IEEE 802.11e to support polling-based contention-free communications with an access point of the WLAN according to Hybrid Coordination Function Controlled Channel Access (HCCA) and prioritized contention-based Enhanced Distributed Channel Access (EDCA). Each service interval for communicating with the access point is divided into (1) an HCCA period during which a wireless communication node allocated to communicate with the access period is assigned with a contention-free time period to communicate with the access point without contention of other nodes and (2) a separate EDCA period during which a wireless communication node contends with other nodes to communicate with the access point based on assigned access categories. The communication delay at each node in communication with the access point is monitored and the traffic load at the access point for communications with nodes in the EDCA period is also monitored. The access of nodes to the access point is dynamically controlled according to the monitored communication delays of nodes and the monitored traffic load. This dynamic control includes at least one of the following: (1) allocating additional time to a selected node which has been previously assigned to communicate with the access point in the HCCA period, (2) assigning a selected node which has been previously assigned to communicate with the access point in the HCCA period and has completed assigned communication with the access point in HCCA, after the HCCA period terminates, to continue communicating with the access point in the EDCA period in contention with other nodes, and (3) allocating a contention-free time period in the HCCA period to a selected node, which has been previously assigned to communicate with the access point in the EDCA period, to communicate with the access point when there is unused time left in the HCCA period after nodes previously assigned to the HCCA period have been served.

This application also describe an exemplary system for controlling communications between wireless communication nodes and an access point in a wireless local area network under IEEE 802.11e to support polling-based contention-free communications between nodes and the access point according to Hybrid Coordination Function Controlled Channel Access (HCCA) and prioritized contention-based Enhanced Distributed Channel Access (EDCA). This system includes a monitoring module having an HCCA monitor which monitors HCCA communication flows to produce HCCA measurements and an EDCA monitor which monitors EDCA communication flows to produce ECCA measurements, and an adaptor module which, in response to the HCCA measurements and the EDCA measurements, operates to dynamically control communications of nodes with the access point in both HCCA and EDCA to reduce an aggregated communication delay caused by delays of individual nodes.

In one implementation of the system, the adaptor module operates to allocate additional time in HCCA to a selected node which has been previously assigned to communicate with the access point in HCCA. In another implementation, the adaptor module operates to assign a selected node, which has been previously assigned to communicate with the access point in HCCA and has completed assigned communication with the access point in HCCA, to continue communicating with the access point in EDCA in contention with other nodes. In yet another implementation, the adaptor module operates to allocate a contention-free time period in HCCA to a selected node, which has been previously assigned to communicate with the access point in EDCA, to communicate with the access point when there is unused time left in HCCA after nodes previously assigned to HCCA have been served. These implementations may be combined.

These and other implementations and variations and other features are now described in detail in the attached drawings, the detailed description and the claims.

BRIEF DESCRIPTION OF DRAWINGS

FIG. 3 shows a comparison of throughputs for constant bit rate (CBR) and variable bit rate (VBR) flows in a WLAN under IEEE 802.11e.

FIGS. 7A and 7B show pseudocodes for exemplary algorithms that implement the present dynamic adaptation.

FIG. 11A illustrates one implementation of the dynamic adaptation where a flow initially assigned in EDCA is reassigned in an available time period in HCCA.

FIGS. 11B and 11C show simulations results for the implementation in FIG. 11A.

DETAILED DESCRIPTION

Figure 1:
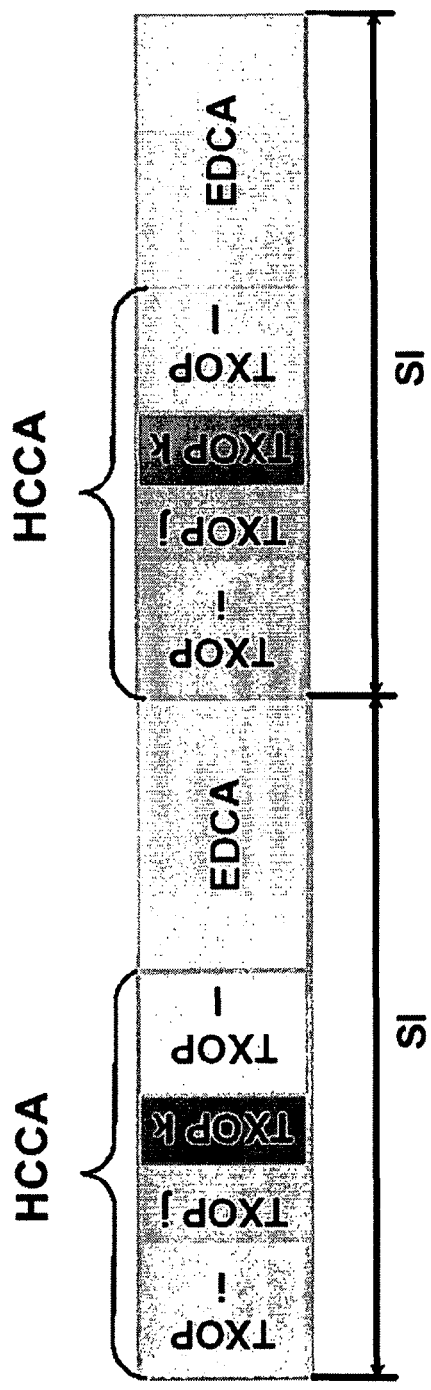
FIG. 1 illustrates hybrid coordination function (HCF) channel access in a wireless local area network (WLAN) under IEEE 802.11e.

Current IEEE 802.11e provisions support service differentiation between the two medium access modes under HCCA and EDCA to allow for enhanced QoS. However, different implementations of such service differentiation may have different levels of enhancements of the QoS. As an example, the scheduling algorithms proposed by Prado have some technical limitations. The centralized scheduling algorithms assume that real-time flows will reserve time for channel access based on their requirements during the centralized scheme. Depending on the application, accurate information about requirements of real-time flows may not be available at the beginning of the flow's transmission. For example, with the use of application layer adaptation techniques, the bit rate requirements of a video stream change based on the congestion in the end-to-end network; hence, it may not be feasible to get accurate information at initialization.

Additionally, HCF only allocates a fixed polling schedule suitable for constant bit rate (CBR) traffic using the averaged values specified in the reservation request, such as mean packet size and required throughput. However, there are multimedia traffic flows that do not have the CBR profile, such as quality-controlled MPEG4 or video-conferencing, and instead use Variable Bit Rate (VBR) encoding. Some of the advantages of VBR encoding include better video quality for the same average bit rate and shorter delay. In addition, service providers commonly use VBR encoding of multimedia content to increase the capacity of the network by multiplexing between different VBR flows. See, e.g., Lakshman et al., "VBR video: Tradeoffs and potentials" in Proceedings of IEEE, vol. 86, pp. 952-973 (May 1998) and Ming-Ting Sun and Amy Reibman, Compressed Video over Networks, chapter 9, Marcel Dekker (2001). With possible inaccuracies in received reservations and traffic variations, Prado's HCF scheduling policies may be inefficient and unsuitable, and could cause unacceptable delays and thereby adversely affecting multimedia quality.

One of the ways to maintain quality for real-time flows with variable needs is to over-provision for the flow requirements at the reservation time. Although this method improves the multimedia quality, system capacity is severely impacted. Another method is to collect information about the flow and predict its future requirements in order to perform resource allocation more appropriately. Note that the frequency of monitoring should depend on the inherent correlation in traffic flow requirements over time. Prediction inaccuracy with this method can lead to inefficient allocation of resources.

In order to improve the quality without impacting the system capacity (channel utilization), we propose a dynamic adaptation methodology to identify and estimate the variable needs dynamically and provide mechanisms to allow additional channel access selectively. By providing additional time to multimedia flows appropriately, the quality of service can be improved over the quality of service under some static schedulers. In one implementation described below, an adaptation policy is provided to configure the polling-based scheduling policy and dynamically associate traffic flows to the appropriate medium access mode. This policy takes into account the possible inaccuracies in reservation information, the variance in flow generation and throughput requirements, and current system utilization. Additionally, the policy performs these adaptations with minimal effects on other flows in the network. To evaluate the effectiveness of this approach, a comparison is made between this adaptation policy with the reference design of a scheduler for 802.11e by Prado. We demonstrate that through our adaptation, the present approach can be implemented in way to achieve significant improvement in QoS in terms of delay and throughput metrics. Additionally, we show the impact of the present adaptation on the quality of multimedia applications and system capacity.

In some implementations, the present dynamic adaptation can be configured to provide, in part, an Access Point (AP) based QoS provisioning mechanism to coordinate the centralized (HCCA) and distributed (EDCA) schemes of IEEE 802.11e. Specifically, we investigated how the mapping of flows to the HCCA and EDCA phases affects the achieved QoS. We first evaluated the traditional approach of restricting background and real-time traffic to the EDCA and HCCA periods respectively. Having identified the limitations of using this approach, we evaluated the potential benefits of dynamically moving flows between the two periods based on network load, and application requirements. The present dynamic adaptation can be used to determine at run time whether a flow should be serviced in HCCA, EDCA, or both. The proposed policy takes into account the possible inaccuracies in reservation information, the variance in flow generation and throughput requirements, and current system utilization. Additionally, the policy makes these adaptations with minimal effects on other flows in the network. We have demonstrated that with our adaptation, the QoS of multimedia applications, in terms of delay and throughput metrics, can be significantly improved.

The dynamic adaptation can be used to improve the Quality of Service (QoS) experienced by end-users over WLAN networks by improving system utilization of the WLAN network via, e.g., using available time in the polling period to minimize the delay experienced by real-time multimedia flows. Additionally, the dynamic adaptation improves the throughput of flows, which may possibly be soft real-time flows, by allocating time in the centralized polling period if there is time available. The overall approach of the dynamic adaptation is to dynamically associate traffic flows to the two channel access modes and modify access privileges based on monitored traffic information. Specifically, with flows scheduled in the centralized polling period of 802.11e, called Hybrid Coordination Function Channel Control Access (HCCA), we consider tracking queue information to recognize when variations from the traffic reservation have led to a queue buildup. When this occurs, we allocate additional time to a traffic flow in order to reduce the flow's queue size and prevent a high experienced packet delay. If there is time available in HCCA, we allocate additional time by re-polling a flow after all previously scheduled flows have been polled. However, if no time remains in the HCCA period, we attempt to decrease the queue buildup through better utilization of the distributed contention period of 802.11e, called the Enhanced Distributed Channel Access (EDCA) period. The algorithm estimates the current load in EDCA and depending on the load, we send a signal encouraging the HCCA traffic flow to send in the EDCA period. In addition to minimizing the delay of HCCA scheduled flows, our algorithm also attempts to improve QoS metrics for EDCA flows by allocating time in the HCCA period if there is time available. For this adaptation, we target high-priority flows that are suffering from throughput degradation due to congestion or channel variations.

Potential applications of various implementations of the present dynamic adaptation include, among others, the ability to provide guaranteed Quality of Service to end-users and improve the system utilization of WLAN networks. The techniques can be commercially useful for WLAN installations that will experience a high volume of real-time multimedia applications, such as airports, offices (for teleconferencing), and households.

In the following sections, certain features in the enhancements in the IEEE 802.11e to support service differentiation are briefly discussed. Next, features and limitations in Prado's scheduling algorithm for implementing the service differentiation in IEEE 802.11e are also discussed. Finally, specific implementations of the present dynamic adaptation approach and simulation results are then described.

IEEE 802.11e defines a new operation mode called the Hybrid Coordination Function (HCF). FIG. 1 illustrates the HCF channel access by showing two adjacent service intervals (Sis) where each service interval includes an HCCA period and an EDCA period. HCF multiplexes between two modes of medium access: a distributed contention-based approach guided by Enhanced Distributed Channel Access (EDCA), and a centralized polling-based approach called HCF Controlled Channel Access (HCCA). Both access functions enhance functionality of the original access methods specified in 802.11a/b/g: Distributed Coordination Function (DCF) and Point Coordination Function (PCF). A basic concept common to the two access schemes proposed in 802.11e is the notion of a transmission opportunity (TXOP). TXOP is a bounded time interval for which a node is allowed to transmit. While TXOPs in EDCA are decided based on traffic flows, in HCCA, TXOPs are selected on a per-node basis.

Enhanced Distributed Channel Access in IEEE 802.11e

Figure 2:
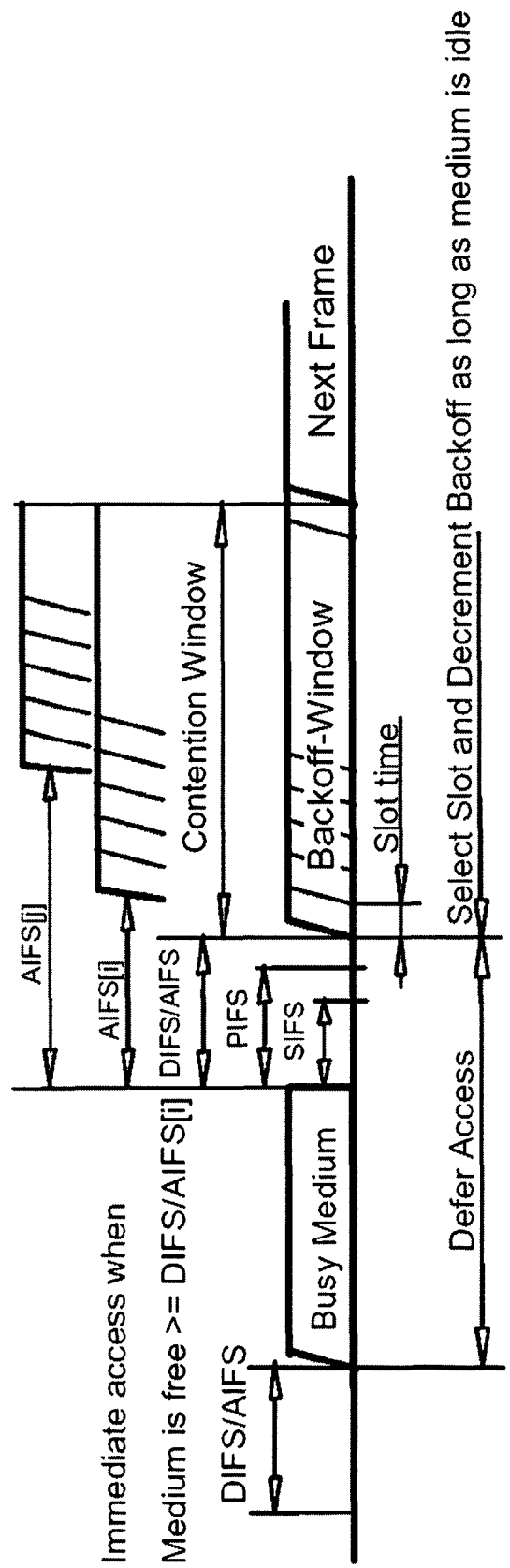
FIG. 2 illustrates the enhanced distributed channel access (EDCA) in a wireless local area network under IEEE 802.11e.

In order to support service differentiation, 802.11e improves over the legacy 802.11 Distributed Coordination Function (DCF) by providing a differentiated channel access mechanism called EDCA. EDCA is a parameterized version of the previous distributed channel access mechanism of 802.11 and associates different channel access parameters to different traffic flows, categorized into different classes called access categories (ACs), to prioritize medium access between different flows. The prioritization in channel access through EDCA is shown in FIG. 2. The modified channel access parameters are Arbitration Interframe Spacing (AIFS) which is the minimum time interval to wait before starting backoff; Transmission Opportunity (TXOP) which is the maximum duration for which the node can transmit; and Contention Window parameters ($CW_{min}$, and $CW_{max}$) which decide the random number of slots to wait before starting transmission.

For each access category (AC), the access parameters are decided by the Access Point (AP), and are beaconed to the nodes in the network.

HCF Controlled Channel Access in IEEE 802.11e

In addition to prioritized channel access, the 802.11e protocol describes a centralized channel access scheme, called HCF Controlled Channel Access (HCCA), to provide guaranteed QoS. FIG. 1 illustrates the channel access scheme used by 802.11e HCCA. Similar to the legacy Point Coordination Function (PCF), HCCA uses a polling-based mechanism, where the medium access is controlled by the AP. The main difference between the legacy PCF and HCCA is the flexibility of when the contention-free period can occur. The AP can begin a contention-free HCCA period if the medium has remained idle for a PCF interframe space period, which is shorter than the minimum AIFS.

During the HCCA contention-free period, the AP polls nodes for a fixed time duration, called TXOP, which is computed based on reservation information periodically sent to the AP by each of the flows. The TXOP for each node is initiated by a poll request from the AP and during this period, transmissions can occur in both the uplink and downlink directions. The periodicity, called service interval SI, is decided based on the minimum delay requirements for all nodes present in the network. This period allows for multiple contention-free transmissions and ends if one of the following conditions occurs: neither the AP nor the node have any packets left to transmit, the channel idle time has exceeded the timeout period, or the time period expires. Note that the TXOP used in HCCA differs from that used in EDCA and is determined by the AP and calculated based on the flow requirements. The use of a fixed duration allows the AP to limit the time allocated to each node and is bounded by the default variable dot11DefaultCPTXOPlimit.

Hybrid Coordination Function Scheduling in IEEE 802.11e

Prado's reference scheduler for the IEEE 802.11e is now described. Nodes with strict QoS requirements send reservation requests containing flow information, such as mean application data rate ($\rho$), mean packet size (L), maximum MSDU size (M), delay bound (D), and minimum physical data rate (R). Using this reservation request, the scheduling policy decides the periodicity and the duration of the polls. The AP determines the minimum service interval (SI) to be used for all of the nodes, where the SI is the time duration between successive polls for the node. The selected SI is the highest sub-multiple of the 802.11e beacon interval duration that satisfies the delay requirements of each flow; i.e. the selected SI should be less than the minimum of required service intervals of all flows. After deciding on the SI for the flows, the AP also allocates a fixed TXOP to each of the flow depending on the mean application data rate as follows.

$$REQ_i = \frac{\rho_i * SI}{M_i} \quad (1)$$

$$TXOP_i = REQ_i * \left(\frac{M_i}{R} + O\right)$$

where O is the overhead due to PHY and MAC headers, IFS, acknowledgment frames, and poll frames.

The maximum time spent in HCCA for each SI is limited by the dot11CAPMax variable, and the total controlled access time in a beacon interval is limited by dot11CAPRate. The above two variables limit the duration of controlled access period and bound the effect of controlled access mode on traffic flows in contention access mode. If the introduction of a new flow violates any of the above two requirements, the AP does not admit additional requests.

The above HCF scheduling policy has a number of technical limitations. Such limitations may significantly degrade the QoS for multimedia communications using VBR flows. Therefore, there is a need for new techniques to support real-time flow requirements. The following sections will illustrate the need for supporting multimedia streams with variable and unpredictable flow requirements.

Variable Requirements of Real-Time Flows

In order to provide support for diverse real-time multimedia applications in WLAN, it is important to understand the service requirements and needs of these applications. The following analysis is focused on video-based applications; however, the findings of the analysis may be equally applied to other applications.

In video applications, streams can be encoded with different objectives resulting in different bitrate requirements. One type of encoding, called Constant Bit Rate (CBR), tries to maintain the bandwidth requirements of encoded streams through appropriate adjustment of compression parameters. However, CBR encoding results in variable quality over time in order to maintain the constant bit rate. Another type of coding tries to maintain the quality of the encoded multimedia through use of constant compression parameters, which leads to variable bit rate requirements over time. Examples of common VBR encoding applications include quality-controlled MPEG4, video conferencing, video multi-casting, etc. Service providers commonly use VBR encoding of multimedia content to increase the capacity of the network by multiplexing between different VBR flows [4] without impacting the multimedia quality.

We use an example video trace to illustrate the differences between CBR and VBR flows. FIGS. 3(a) and 3(b) show bit rate requirements over time of CBR and VBR encoding of a movie (Jurassic Parks with 25 frames/sec). For a VBR-encoded video, the bit rate requirements can vary widely over time.

In addition to VBR encoding, application layer adaptation can lead to variations in bitrate requirements over time. For example, current streaming servers dynamically switch between different streams statically encoded at different target bitrates in order to cope with bandwidth fluctuations in the end-to-end network. This application layer adaptation results in dynamically changing flow requirements in a video stream. Having shown that the flow requirements can change over time, next, we analyze the effect of using the HCF reference scheduler with the variable traffic flows.

Analysis of HCF Reference Scheduling Policy

As described earlier, the reference scheduler by Prado allocates a fixed TXOP for each flow based on mean data rate, and each flow is serviced in fixed service intervals. Although this scheduling is well suited for CBR traffic, the queues of HCCA flows with VBR traffic can build up and eventually lead to large delays and dropped packets.

In order to understand the limitations of 802.11e scheduling for VBR traffic, we evaluate the delay of a traffic flow due to its residual queue length using the reference scheduler. We model the VBR traffic data rate as a Gaussian curve probability density function with a mean and standard deviation of $\mu$ and $\sigma$ respectively. The use of a Gaussian curve to represent VBR is motivated from previous studies [6] [7]. For the example illustrated above, the bitrate requirements can be modeled as a Gaussian distribution with mean 338 Kb/sec and standard deviation of 134 Kb/sec.

Let x denote the queue length value in terms of number of packets and i be the current service interval. We define the probability distribution function of packet arrival and residual queue length for service interval i by $IN_i(x)$ and $RES_i(x)$ respectively.

$$IN_i(\chi) = \frac{1}{\sqrt{2\pi\sigma^2}} * e^{\frac{-(\chi-\mu)^2}{2\sigma^2}} \quad (2)$$

The residual queue length after service interval i is a function of the residual queue length in the last service interval, incoming packets and packets scheduled in the current service interval, as expressed below.

$$RES_i(\chi) = f(RES_{i-1}(x) + IN_i(\chi), SCH_i(x)) \quad (3)$$

where SCHi(x) represents the number of packets scheduled by the HCCA scheduler in service interval i.

Using the HCCA scheduler, the number of packets serviced per SI is fixed and is based on the TXOP given by the AP. We assume that ρ is the number of packets serviced per SI, i.e.

$$\forall i \; SCH_i(\chi) = \text{impulse}(\rho) \quad (4)$$

Hence, the residual queue length is given by the following equation:

$$RES_i(\chi) = \begin{cases} 0 & \text{if } RES_{i-1}(\chi) + IN_i(\chi) < \rho \\ RES_{i-1}(\chi) + IN_i(\chi) - \rho & \text{otherwise} \end{cases}$$

Note that the probability density function of the residual queue length is a discontinuous function at zero. Also, the probability of having no packets at the end of a service interval is equal to the probability that the packets needing to be serviced, given by the incoming packets and the residual queue length of the previous service interval, is less than the number of packets serviced per service interval, ρ.

Since the closed form of determining the probability curves of the above equations after a fixed number of service intervals is difficult due to the discontinuous function for the residual queue length, $RES_i(x)$, we evaluated these equations using discontinuous probabilistic analysis. In order to understand how the residual queue length of a node can vary after a fixed number of service intervals, we used Matlab to input the Gaussian probability density function with the service rate of the HCCA scheduler and had the program output the probability density function of the residual queue length after a fixed number of service intervals.

Figure 4:
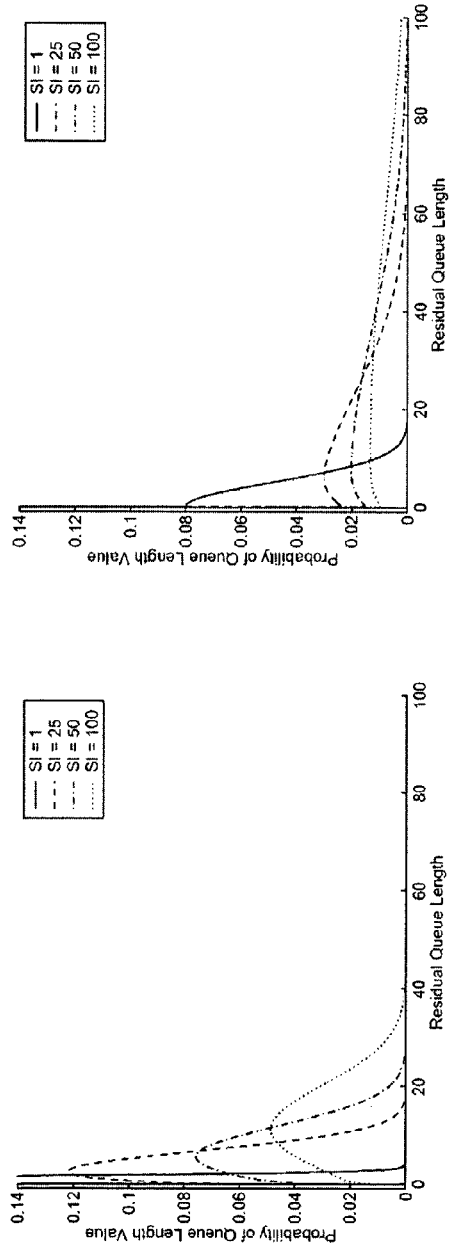
FIG. 4 shows probability density functions (PDFs) of the residual queue length after (1, 25, 50, 100) service intervals for the two Gaussian input curves, respectively.

We evaluated these equations numerically considering two Gaussian inputs, (μ,σ): [(20, 5), (20, 1)], to find the probability density function of the residual queue length of the flow. Since the 802.11e reference scheduler provisions for the mean value, for this evaluation, we consider a service rate equal to the mean ρ=μ. FIGS. 4(a) and 4(b) illustrate the probability density functions of the residual queue length after (1, 25, 50, 100) SIs for the two Gaussian input curves respectively. Note that the curves indicate that the expected values of the queue length after 100 SI are not zero. In fact, the expected values of the queue length for the two Gaussian inputs are 41 packets and 17 packets respectively.

With an increase in the residual queue length, the delay of each packet increases and can potentially be larger than the tolerable delay limit. This high delay leads to degraded video playback, such as stalls and blurs, depending on the transport protocol used. For instance, when TCP is used, the delay in packets causes stalls due to its reliable packet delivery mechanism. However, when UDP is used, the default packet loss concealment technique uses the previous frame if the packet does not arrive in time. The concealment method would lead to blurs in the video playback. Next, we discuss alternative techniques in addressing variability due to VBR encoding and their limitations.

Limitations of Current Approaches

One of the limitations of the Prado's HCCA scheduling is that the real-time flows with hard deadlines are restricted to being serviced for a fixed duration in the HCCA period, while other flows are left to contend in EDCA. Although this scheduling policy is simple, it has a few limitations in satisfying requirements of diverse applications such as real-time flows with VBR traffic as shown above. A possible solution to reduce the residual queue length buildup is to over-provision for each flow and allocate additional time for every service interval. One example would be to use both the mean and standard deviation parameters in determining the number of packets serviced per service interval.

Figure 5:
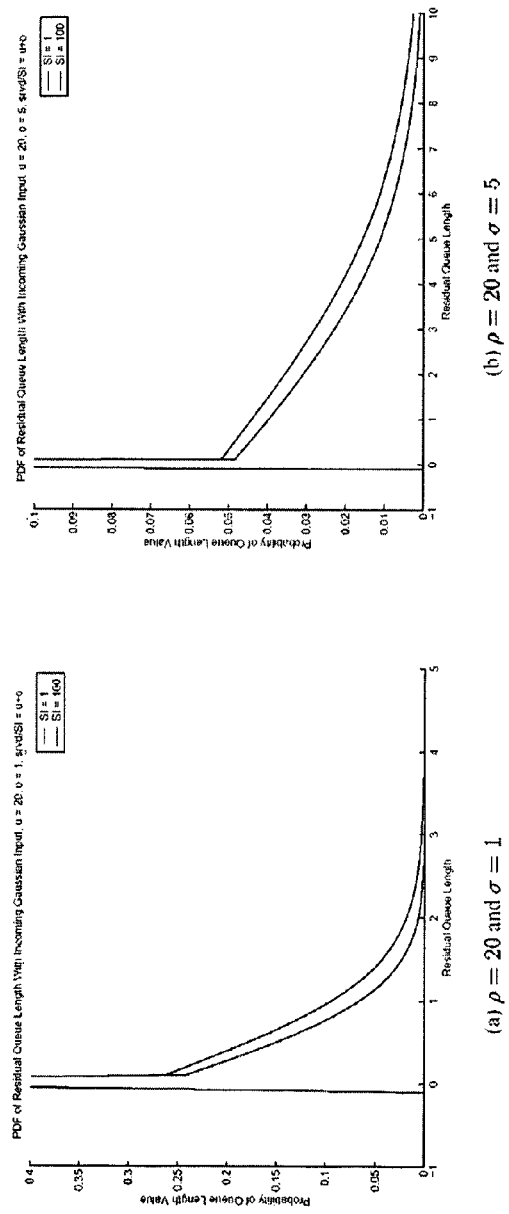
FIG. 5 shows the PDFs of residual queue lengths of the same Gaussian inputs with a modified $\rho$ given by $\mu+\sigma$.

FIGS. 5(a) and 5(b) illustrate the PDF of residual queue lengths of the same Gaussian inputs with a modified ρ given by μ+σ. The expected value of the residual queue length decreases significantly. The above example illustrates that if it is possible to allocate more time for each flow, a queue buildup can be avoided. However, there is a tradeoff between the number of flows that can be serviced the AP and the amount of time allocated to each flow. Thus, in order to satisfy the VBR requirements, there is a need to allocate additional time to VBR flows dynamically.

Additionally, in the reference scheduling policy, the AP maintains a clear separation between the centralized HCCA and distributed EDCA periods. According to the separate resource allocation schemes, the real-time flows are not allowed to transmit using the contention-based mechanism even when the load in EDCA period is low. This leads to a poor utilization of channel resources during the contention period, and reduces capacity and multimedia quality in HCCA flows because of the limitations imposed by the dot11CAPRate and dot11CAPMax.

Other searchers observed similar limitations of the current scheduler for VBR traffic and propose Flexible HCF (FHCF) framework to address some of the above limitations. See, e.g., Pierre Ansel, Qiang Ni, and Thierry Turletti, "An efficient scheduling scheme for IEEE 802.11e," in *Proc. of WiOpt, Modeling and Optimization in Mobile, Ad Hoc and Wireless Networks* (March, 2004). Briefly, the FHCF algorithm monitors queue length and expands or shrinks the TXOP of each flow based on this information. In the case where the additional time is limited, the algorithm divides the time between the flows in a fair manner. There are a few limitations with this approach: (1) Fair division of allocated time to each of the flows may be insufficient in providing relief for residual queue buildup, (2) Aggressive adaptation to adjust TXOP may lead to further delays in cases where traffic variability is high, and (3) Frequent adjustment of TXOP may interfere (high jitter) with other nodes scheduled in the HCCA period.

Adaptation Policy

This application describes implementations of a dynamic adaptation framework which can be used to improve overall Quality of Service (QoS). In some applications, such dynamic adaptation may be used to overcome, at least in part, the limitations of the 802.11e scheduling algorithm by Prado and the associated negative effects.

To improve the QoS for multimedia flows, the dynamic adaptation may be configured and implemented to minimize the aggregated utility value of the experienced packet delay. We can express this objective by the following equation, $$\min \sum_{j=1}^{N} U_j(d_j) \quad (5)$$

where j represents the node index, $d_j$ is the average packet delay experienced by node j, and N is the total number of nodes. Since the experienced packet delay for a flow is a function of the residual packet queue length, we specifically look at minimizing the utility of the aggregated residual queue lengths in each service interval:

$$\min \sum_{j=1}^{N} U_j(res_j) \quad (6)$$

where $res_j$ represents average residual packet queue length for node j.

The overall approach of our algorithm is to minimize the residual queue length by dynamically configuring the polling schedule in the HCCA period, called HCCA Allocation, and selectively allowing real-time flows to transmit in the EDCA period if needed, called EDCA Mapping.

HCCA Allocation

The HCCA allocation can be used to determine a polling schedule so as to meet the objective expressed by Equation 6. The polling schedule can be expressed as [(PU$_1$, PTXOP$_1$), ..., (PU$_1$, PTXOP$_1$), ... (PU$_T$, PTXOP$_T$)] represent the index of the node being polled and the TXOP allocated for the lth poll respectively, and T is the maximum number of polls. The mean time requested for each flow j is denoted as TXREQ$_j$, and the time allocated for each flow in a service interval j, called TXOP$_j$ can be expressed as $$TXOP_j = \sum_{\forall (l) where PU_l = j}^{T} PTXOP_l \quad (7)$$

We assume that the polling schedule solution should meet the constraints inherent to the HCCA scheduler; (1) the total time allocated must be less than the total time available in each service interval, (2) each node must be polled at least once during the HCCA time period and polling times are non-overlapping, and (3) the time allocated to each node must be greater than or equal to the flow's requested mean requirements. The above constraints can be expressed by the following equations.

$$\sum_{j=1}^{N} TXOP_j < MAX\_POLL\_PERIOD \quad (8)$$

$$\forall (j) \exists (PU_l) s.t. PU_l = j \quad (9)$$

$$TXOP_j \geq TXREQ_j \quad (10)$$

In the above equations, MAX_POLL_PERIOD denotes the maximum polling duration available in each service interval determined by the dot11CAPMaxRate and dot11CAPRate settings.

EDCA Mapping

In addition to allocating available time in HCCA period, we consider the case when there is no time available for reallocation in the HCCA period. The current HCF framework assumes that the real-time flows will only send packets in their allocated time. However, by selectively allowing some flows into the EDCA period, we attempt to decrease the queue buildup when increasing TXOP$_j$ is not possible in the HCCA period.

The objective of EDCA Mapping is to select the flows, expressed by S, that can benefit from additional time in EDCA with the constraint that the impact on the EDCA flows due to the additional real-time flow is minimal. We need to understand the tradeoff between the benefits of HCCA delay reduction and negative impact on EDCA flows. This goal is to select the set can be expressed by the following expression:

$$\max U \left( \sum_{m \in s} B_m, \sum_{m \in s} C_m \right) \quad (11)$$

where $B_m$ represents the total benefit in terms of the reduction in delay for node m, and represents the cost of mapping node m in EDCA. Mainly, $C_m$ is the impact on EDCA flows that can be given in terms of throughput, congestion, and increased collision.

Implementations of Adaptation Policy

The implementations of the present dynamic adaptation are based on the following assumptions. First, we assume that the AP uses the reference scheduler to determine the initial polling schedule. With this scheme, the AP receives reservation requests, schedules the appropriate transmission opportunities to each node in the network, and polls all nodes using a fixed service interval. Hence for each flow j, the following parameters are determined: the original service time based on the reservation request, TXREQ$_j$, and a polling slot PU$_l$ for the node j. Note that using the original scheduler TXOP$_j$=TXREQ$_j$=PTXOP$_l$, meaning the total transmission opportunity allocated to node j is equal to the mean service time TXREQ$_j$ and PU$_l$=j. Second, it is assumed that each flow is limited to one poll during one service interval. In other words, $$\sum_{\forall l s.t. PU_l = j} PU_l = 1 \quad (12)$$

With these assumptions, the ideal queue length for flows scheduled in HCCA after each SI is zero.

Additionally, we assume that flows that have been scheduled in HCCA only send packets in the polling-based period and that the remaining flows without reservations are restricted to sending in the EDCA period. In addition all flows provide queue length information to the AP using the control field of the 802.11e packet header. Finally, a real-time flow can be notified of the possibility of transmitting in the EDCA period.

Figure 6:
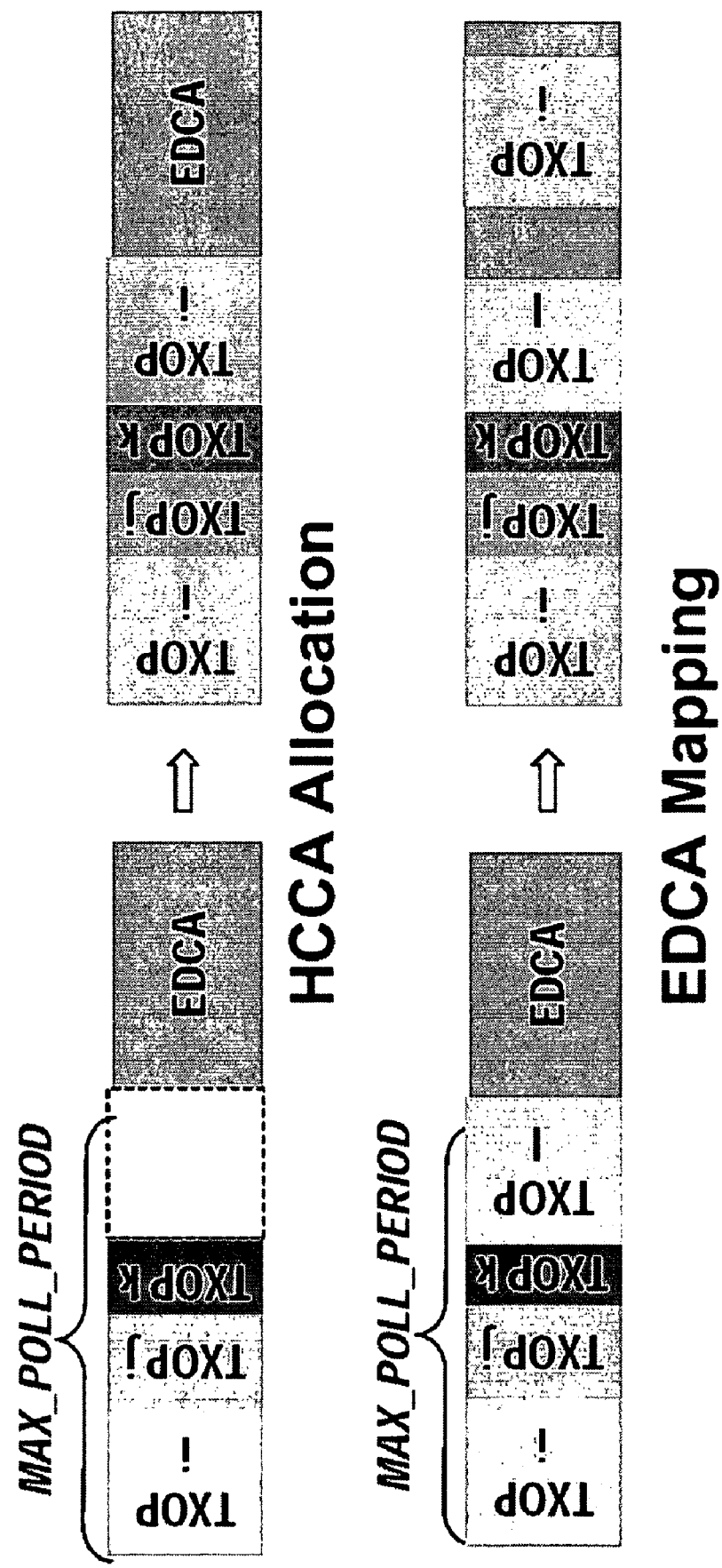
FIG. 6 illustrates HCCA allocation and EDCA allocation in one implementation of the present dynamic adaptation.

FIG. 6 illustrates the overall policy of our adaptation. In order to modify channel access privileges and allocate additional time for flows, we answer the following questions:

(1) How do we recognize which flows need to be adapted and select between flows in a fair manner?

(2) How should we perform HCCA allocation so as to minimize the effects on other flows in the network?

(3) What are the acceptable conditions to run the EDCA mapping adaptation and when should it be run?

Determining Flows to be Adapted

We determine which flows need to be adapted by looking at the utility function of the residual queue length. Note that in order to minimize the utility function of the residual queue length, it is necessary to reduce the actual queue length of the nodes. We use a steepest-descent approach to minimize the length of the residual queue. Assuming $U(res_j) = res_j/TXREQ_j$, we begin with the node j with the queue length that will potentially have the highest delay, taking into account its $TXREQ_j$, in other words $\max(res_j/TXPREQ_j)$.

Although the greedy approach finds the node with the largest queue length given their reservation request, allocating all the remaining time in the HCCA period to one node would lead to unfairness. To ensure that other flows are able to receive some of the additional time available, we combine the queue information with the last adaptation time to determine a weight per flow and perform round-robin selection based on these weights.

HCCA Allocation

Upon deciding which flows need to be adapted, the algorithm needs to decide whether it is possible and beneficial to allocate additional time and modify channel access privileges. For HCCA allocation to be possible, there has to be sufficient time remaining in HCCA for the flow to be polled i.e. after $TXOP_j$ has been adjusted, $\Sigma(1, j=S) TXOP_j < MAX\_POLL\_PERIOD$ constraint should still hold.

In our scheme, as shown in FIG. 6, we allocate additional time by re-polling the flow i after all previously scheduled flows have been polled. We maintain the original polling list and hence, between polls 1 to N, the nodes scheduled, i.e. $PU_1$ to $PU_N$, and the time allocated are left fixed. However, for the remaining polls, from N+1 to T, we select flows that have been identified as possible VBR flows and allocate the appropriate $TXOP_j$ for these flows.

In various applications, this approach may be more suitable than simple extension of the time duration for the flow because this can avoid unnecessary delays for other flows that are scheduled in HCCA. Recall that the FHCF scheme discussed earlier configures the fixed $TXOP_j$ of a node in a poll, by adjusting the $PTXOP_j$ for flow j starting at poll l, where $PU_l=j$. With this approach, other flows may be delayed due to additional time allocation to flows scheduled prior to them. By maintaining the original schedule, we avoid affecting other flows. Although there is the extra overhead of the additional poll, this overhead is minimal and only consists of a poll frame and a SIFS period. Additionally, the FHCF algorithm attempts to take advantage of the "lag" of a flow by reducing the $TXOP_j$ of the node. Although this can provide for more allocation time, this reduction means that at some intervals, the allocated time is less than the reserved time, $TXOP_j \geq TXREQ_j$. This may violate the assumption that the flow will have at least the mean requirement reserved for each service interval. Although the FHCF algorithm eventually adjusts for the additional time when needed, the change may lead to a constant oscillation in allocated time.

EDCA Mapping

In the case where HCCA allocation is not possible, another method used to minimize the residual queue length is to encourage flows to send during the EDCA period, as shown in FIG. 6, where node j is allowed to send in EDCA. One consideration of this adaptation is the negative impact, $C_j$, on the flows in EDCA due to the mapping of node j. If an HCCA flow is encouraged to send in EDCA when the network is congested, the traffic flow may suffer from retransmissions due to collision and cause negative effects on other traffic flows. Hence, to avoid such problems, the network load must be estimated by the AP.

In our approach, the network load is estimated using two statistics: utilization ratio and collision count. The AP calculates the utilization by monitoring the time used in EDCA, summing the transmission durations of successfully received packets over the total time available. Although the utilization ratio is a good indicator of the network load under low load conditions, the value saturates as the load increases due to collisions. Under such conditions, we additionally use a collision metric that is determined by averaging the number of collisions that occur over the EDCA period. Experiments on the details of the utilization ratio and collision count can be found in the experimental section.

In our proposed adaptation scheme, after a fixed number of SIs, we compare the current utilization and collision metrics with preset threshold values and decide on whether it is appropriate to map additional VBR flows to the EDCA period. This is to minimize the impact on EDCA flows and avoid additional collisions experienced by the introduced VBR flow. The flows mapped in the EDCA period are decided by the priorities described earlier and is based on the current residual queue size and last adaptation time. In order to reduce the negative impact of erroneous adaptation, we monitor the changed utilization and collision metrics after adaptation. In the case where the average utilization reduces and collisions increase significantly, we reverse the last EDCA mapping adaptation of the VBR flows. The cost and benefit of this adaptation is given by the change in the load metrics and the reduction in the residual queue size respectively.

Adaptation Algorithm and Framework

The pseudocode provided in FIGS. 7A and 7B provide further details of the above algorithm. The first step of the algorithm is to monitor the current network conditions. The AP then proceeds with the original polling schedule and updates the queue statistics accordingly. Having completed polling the original schedule, the algorithm then allocates additional time in the HCCA scheduling period. By calculating the available time in HCCA (hcca_slack), the algorithm determines iteratively if there is available time to schedule in HCCA. The selection process of the flows is based on the weights described earlier in this section. In the case where the HCCA period is unable to support additional polling and there are remaining HCCA flows in need of additional scheduling, the AP explicitly signals to the real-time flow to send during the EDCA period.

Figure 8:
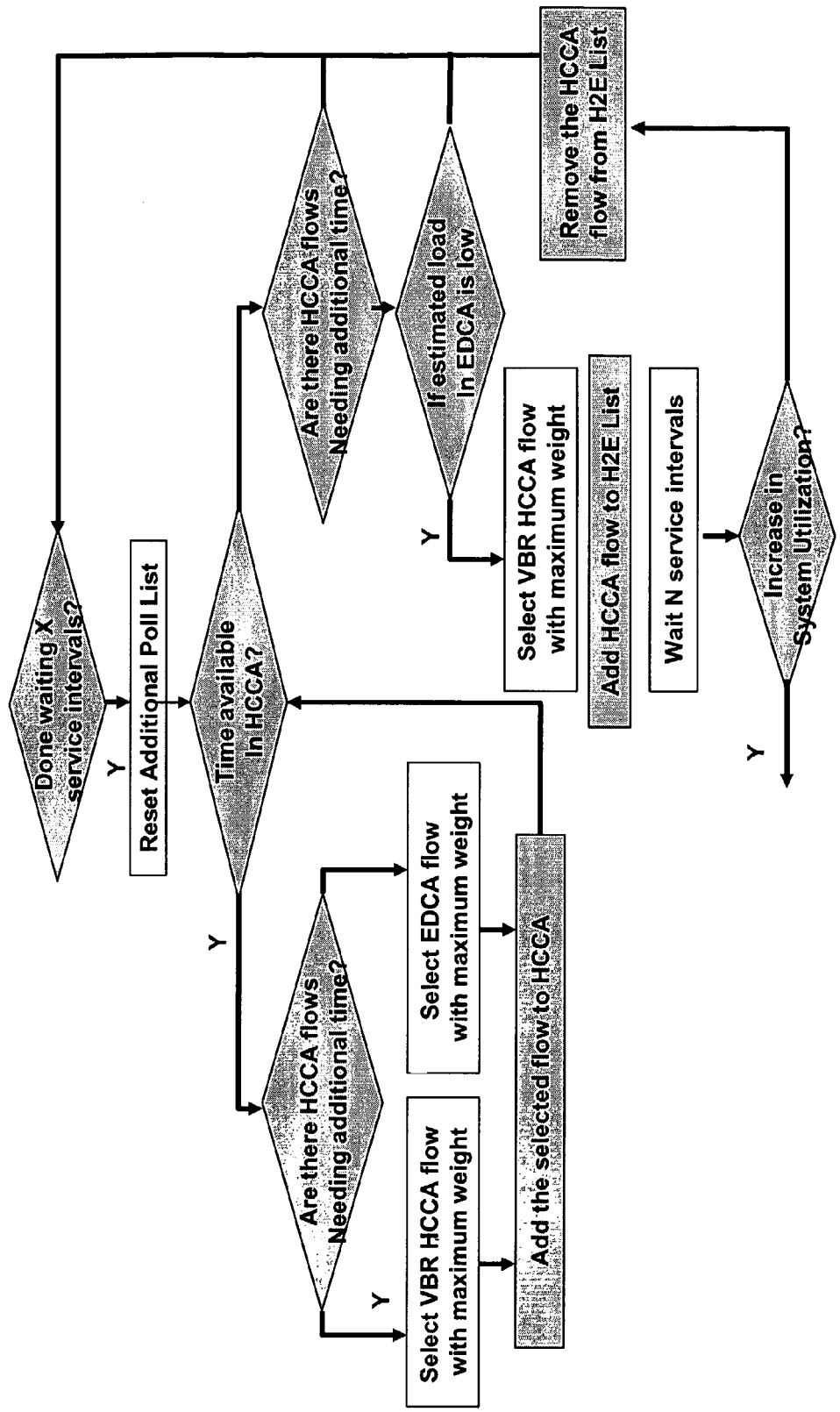
FIG. 8 shows one exemplary flowchart for one implementation of a dynamic adaptation algorithm.

FIG. 8 further shows a flowchart illustrating one implementation of the adaptation algorithm.

Figure 9:
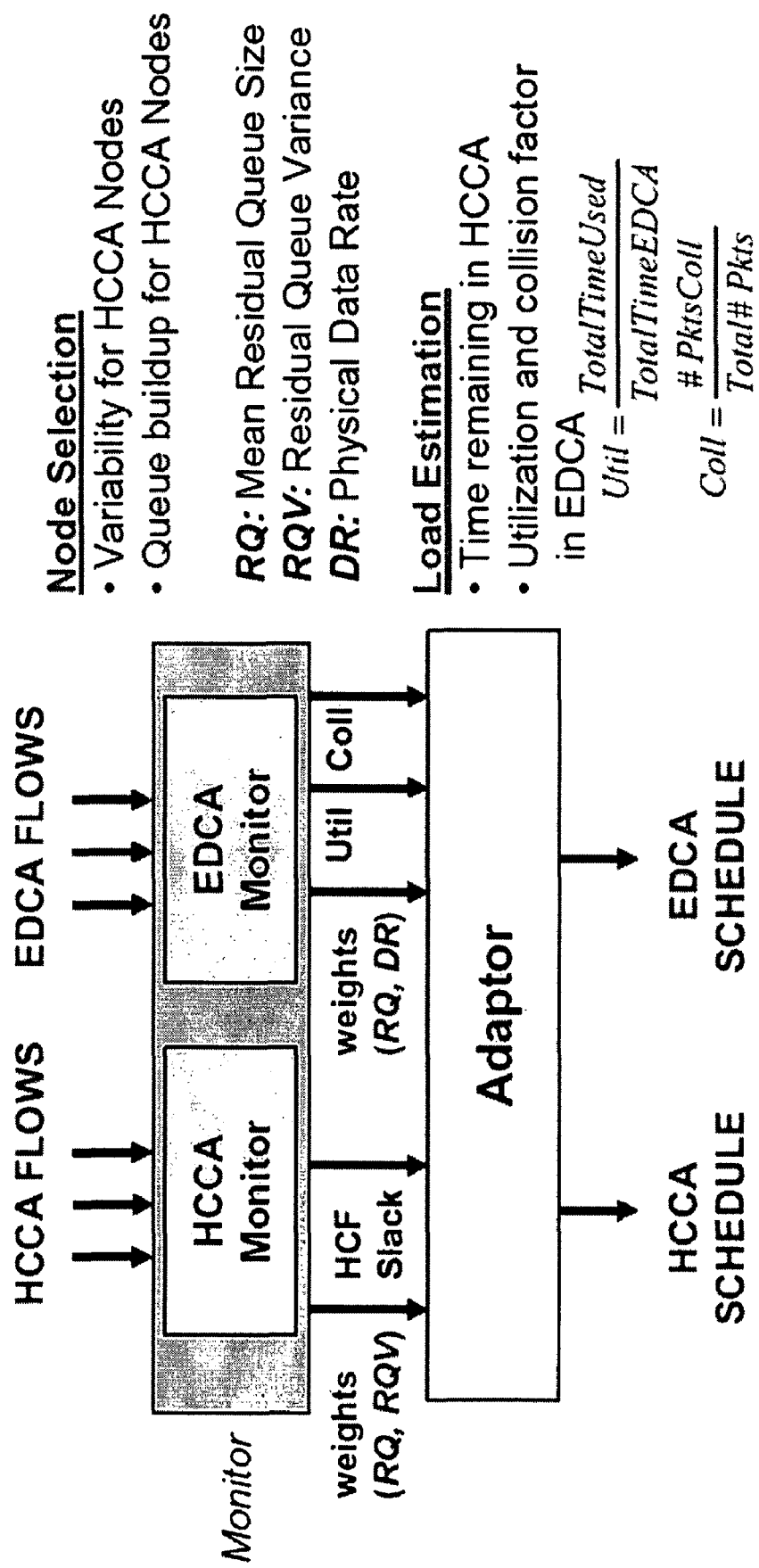
FIG. 9 shows a system that includes a monitor module and an adaptor module to implement the dynamic adaptation.

In order to run the described dynamic adaptation, an adaptation framework may be implemented to include two main functional components: a monitor module and an adaptor module. FIG. 9 shows a system with the monitor module and the adaptor module. The monitor includes an HCCA monitor and an EDCA monitor. The monitor tracks the current conditions in both the HCCA and EDCA periods and provides the adaptor with the flow weights and load information of the HCCA and EDCA periods, through a number of tracked statistics. Using these values and information given by the monitor, the adaptor decides which nodes can benefit from the switch, when nodes can be switched, and how they should be switched.

Simulation Analysis

Simulations have been conducted under IEEE 802.11e using the adaptation framework over a diverse set of multimedia traffic profiles and network load. We begin briefly by describing the experimental setup and system configuration. Next, we evaluate the improvement in performance due to HCCA flow reallocation in both the HCCA and EDCA periods. We then present a comparison of the framework with the Flexible HCF (FHCF) mechanism, proposed in the above cited publication by Ansel et al. Finally, we describe the effect of the adaptations on the quality of the video and overall system capacity.

Simulation Setup and System Configuration

For our experiments, we used the Opnet simulation environment provided by Opnet. See, "Opnet simulation framework,". In order to simulate the IEEE 802.11e standard, we modified the IEEE 802.11b MAC layer models to incorporate HCCA and EDCA service differentiation. We have validated our implementation of 802.111e with other known models. The default characteristics of the simulated wireless networks are listed in Table 1.

TABLE 1

Simulation Parameter Settings

| Parameter | Value |
| --- | --- |
| PHY Rate | 11 Mb/s |
| Beacon Interval | 100 ms |
| dot11DefaultCPTXOPLimit | 2000 us |
| dot11CAPRate | 21 us |
| dot11CAPMax | 8000 us |
| SIFS | 10 us |
| DIFS | 50 us |
| PIFS | 30 us |
| SlotTime | 20 us |

TABLE 2

Application Profiles and Characteristics

| App. Profile | Throughput (Kb/s) Mean | Throughput (Kb/s) Std. Dev. | Mean Pkt. Size (bytes) | Delay Req. (ms) |
| --- | --- | --- | --- | --- |
| Video1_VBR | 445 | 282 | 4000 | 120 |
| Video1_CBR | 445 | 20 | 4450 | 120 |
| Video2_CBR | 256 | 26 | 1024 | 40 |
| Vldeo3_VBR | 340 | 90 | 1700 | 60 |
| EDCA | 256 | — | 512 | — |

In our network configuration, we assume that each node is associated with only one flow and remains at fixed location that is distributed uniformly in the area of 300 m×300 m, i.e. the range of an access point. To generate different types of application traffic, we use the Opnet application and profile configuration to set the packet size and inter-packet gap, guided by information from video traces. For the VBR video source models, we incorporated various packet traces of H.263 video streams collected from "Video traces for network performance evaluation" at http://trace.eas.asu.edu/. Table 2 summarizes the various application profiles used in our evaluation.

Evaluation of HCCA Allocation

Before evaluating our proposed adaptation, we begin by illustrating the limitations of the current HCF scheduling policy for VBR traffic. For comparing the performance of the algorithms, we use the delay and as metrics for Quality of Service (QoS). We first evaluate the difference in the delays experienced by CBR and VBR real-time flows using the HCCA reference scheduler.

Figure 10:
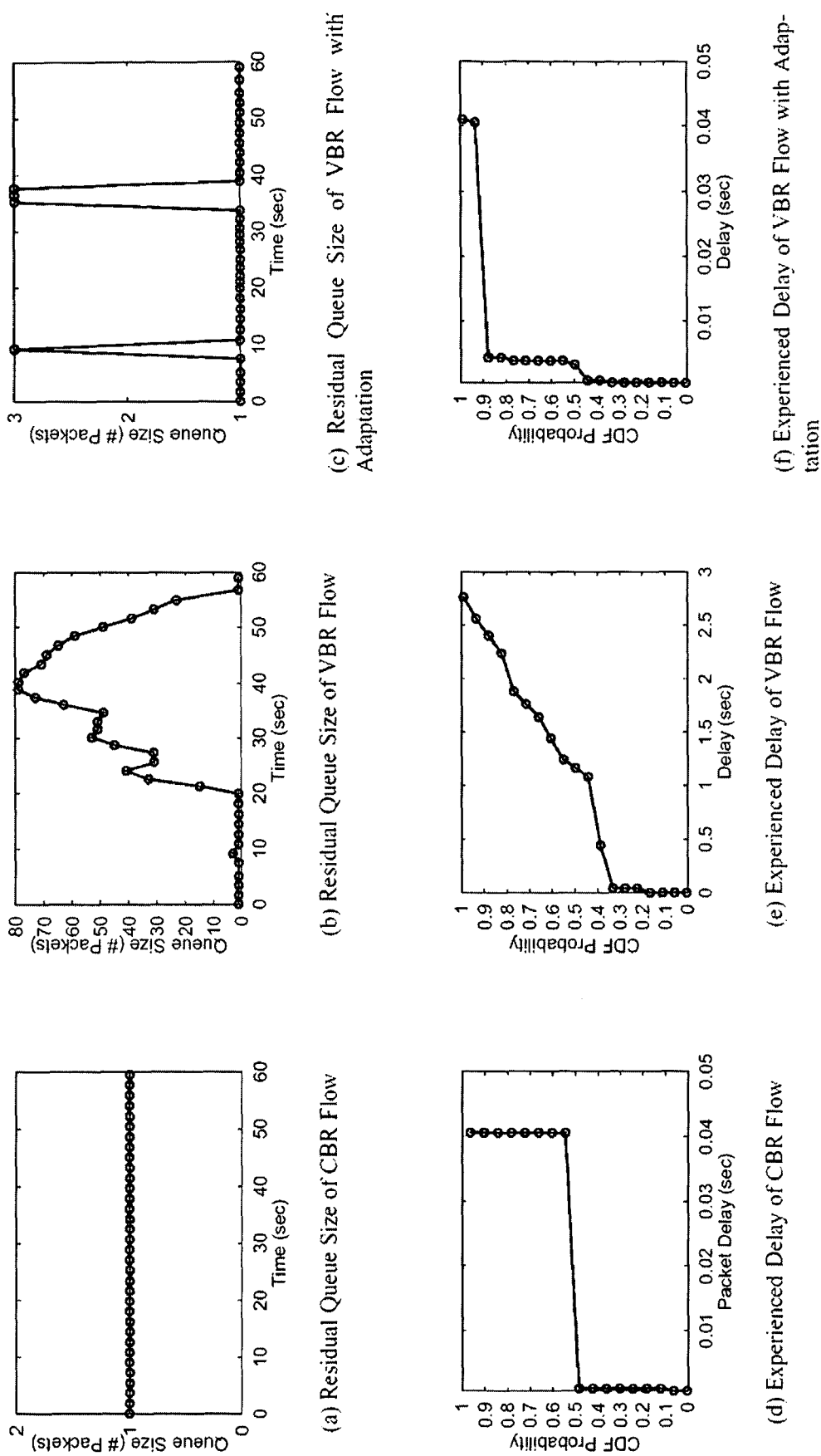
FIG. 10 shows residual queue sizes and delays for CBR and VBR flows in simulations.

FIGS. 10(a) and 10(d) show the residual queue buildup and delay experienced by a CBR (Video1_CBR) flow. Note that with the CBR flow that the delay experienced is low and well within the desired delay limit (120 ms). However, with the VBR flow, the flow experiences a high queue buildup and delay, as shown in FIGS. 10(b) and 10(e).

Having showed the limitations of the reference scheduler, we evaluate the performance of the algorithm on HCCA flows in the above scenario. FIGS. 10(c) and 10(f) illustrate the experienced delay and the queue size respectively using the algorithm's time allocation in HCCA. As seen from the graph, the proposed algorithm can significantly reduce the delay experienced by the HCCA flow. The observed reduction in delay in this scenario is due to the reallocation of the remaining time of the HCCA period to the VBR traffic flows. By reducing the delay and queue buildup of the VBR flow, the algorithm can avoid exceeding the maximum delay and decrease the packet loss experienced by the flow.

We next evaluate our adaptation algorithm over VBR flows with different variability. For this evaluation, we look at different sequences of Video1_VBR flow and observe the average delay experienced by the flow with and without our adaptation framework. Table 3 shows the results of our evaluation. For each video sequence, we report the mean and standard deviation of the data rate, delay experienced with and without our adaptation.

TABLE 3

Effect of Video Variability on Adaptation

| | Data Rate (kb/s) | | Delay (ms) | |
| --- | --- | --- | --- | --- |
| Video | Mean | Std. Dev. | Without Adapt. | With Adapt. |
| Video1_1 | 387 | 140 | 1088 | 6 |
| Video1_2 | 416 | 197 | 733 | 10 |
| Video1_3 | 425 | 225 | 1029 | 97 |
| Video1_4 | 467 | 216 | 4640 | 118 |

It can be seen from the table that the proposed adaptation is able to significantly decrease the delay in all of the cases. One thing to note is the variability of a video cannot be solely given by its standard deviation. In terms of residual queue length buildup, the important characteristic of the video is the temporal variability. Note that with Video1_1, where the standard deviation is smaller than the other videos, the experienced delay without adaptation is still large. Looking more closely at the packet profile of these flows, one can see that the temporal variability (burstiness) of these video streams can impact delay significantly. The packet profile indicates some videos, such as Video1_2, have slightly higher standard deviations, but the variability is well spread out over the simulated time, avoiding a significant queue buildup and high delays. Additionally, in this evaluation, we have assumed that at most one additional poll is allowed for each flow in a given service interval. We believe that the impact of the adaptation can be improved by allowing more than one poll per service interval and this parameter can be configured appropriately to support traffic flows with widely varying data requirements.

TABLE 4

Effect of Adaptation on Mean Throughput and Delay of HCCA VBR Flows

| No. of VBR Flows | Thrpt (Kb/s) Without Adapt. | Thrpt (Kb/s) With Adapt. | Factor of Improv. | Delay (ms) Without Adapt. | Delay (ms) With Adapt. | Factor of Improv. |
|---|---|---|---|---|---|---|
| 1 | 383 | 3023 | 7.9 | 637 | 10 | 63.8 |
| 2 | 389 | 2972 | 7.6 | 656 | 11 | 59.6 |
| 4 | 258 | 2085 | 8.1 | 813 | 14 | 58.1 |
| 8 | 318 | 1401 | 4.4 | 665 | 23 | 28.9 |

We now look at the impact of the adaptation when there are multiple VBR flows. We consider one CBR flow (Video2_CBR) and vary the number of HCCA flows with VBR traffic (Video1_VBR), from one to eight flows. Table 4 presents the results of our evaluation in terms of throughput achieved and delay experienced averaged over all HCCA flows considered. The variations in the throughput achieved by the VBR flow without adaptation are due to random event related variations in the Opnet simulation. This may possibly be avoided with longer simulation durations. However, it can be seen that with adaptation, the improvement in mean throughput is mainly dependent on the number of VBR flows and is reduced with an increase in the number of simultaneous VBR flows. For example, as the number of nodes increase from one to eight, the effect of the adaptation reduces from 64× to 29×. This is mainly due to the fact that the available time for reallocation in the HCCA period reduces as the number of nodes increase; hence, the adaptation algorithm is less effective.

Flow Reallocation in EDCA

In the case where the HCCA period has limited available time, the effectiveness of flow reallocation in HCCA is reduced to the case without adaptation. In this subsection, we look at the effectiveness of the second method in our proposed adaptation, EDCA mapping, when reallocation in HCCA is not possible and the load in EDCA can support additional flows. For these experiments, we consider three cases: (1) when no adaptation is used (Adapt_None), (2) when all VBR flows are allowed to send in the EDCA period (Adapt_All), and (3) when selected nodes are allowed to send in EDCA (Adapt_Select). For each case, we observe the utilization ratio, collision count, delay, and throughput of the VBR node being adapted. Table 5 shows the values of these parameters respectively in the various scenarios.

In the case without adaptation, it can be seen that as the number of active nodes increase in EDCA, the utilization, which is measured by the ratio of the time used for successful transmission to the time available in EDCA, increases and flattens out as the number of nodes increases. Corresponding to the plateau of the utilization ratio, the collision count increases significantly as the number of active nodes increase due to the contention-based channel access. Additionally, without adaptation, the VBR flow experiences an unacceptable delay and low throughput in all the scenarios.

TABLE 5

Effect of EDCA Mapping

| No. of EDCA Flows | Adapt None | | | | Adapt All | | | | Adapt Selected | | | |
| | Coll. Count | Util. Ratio | Delay (ms) | Thrpt (kb/s) | Coll. Count | Util. Ratio | Delay (ms) | Thrpt (kb/s) | Coll. Count | Util. Ratio | Delay (ms) | Thrpt (kb/s) |
|---|---|---|---|---|---|---|---|---|---|---|---|---|
| 1 | 0.000 | 0.036 | 624 | 396 | 0.054 | 0.057 | 22 | 2,160 | 0.047 | 0.045 | 23 | 2,184 |
| 2 | 0.324 | 0.072 | 631 | 381 | 0.387 | 0.093 | 22 | 2,218 | 0.412 | 0.081 | 23 | 2,182 |
| 4 | 1.370 | 0.144 | 826 | 303 | 1.390 | 0.165 | 23 | 2,165 | 1.390 | 0.150 | 117 | 1,422 |
| 8 | 3.560 | 0.287 | 753 | 361 | 3.766 | 0.304 | 24 | 2,222 | 3.720 | 0.290 | 130 | 1,549 |
| 12 | 11.430 | 0.388 | 772 | 369 | 11.400 | 0.386 | 105 | 1,581 | 11.430 | 0.388 | 772 | 369 |
| 16 | 13.750 | 0.400 | 753 | 386 | 13.900 | 0.357 | 204 | 386 | 13.750 | 0.400 | 753 | 386 |

Having looked at the case where no adaptation is used, we consider the case where all VBR flows needing additional time are allowed to send in EDCA. We can see from the table that the utilization metric and collision count increases slightly when the VBR flow is adapted in the scenarios where there are one to eight nodes in the EDCA period. However, in the scenarios with twelve and sixteen nodes, by using this adaptation without considering the load in EDCA, the VBR flow can negatively impact the EDCA utilization. For instance, in the case of sixteen nodes, the use of EDCA mapping leads to a decrease in utilization ratio, from 0.400 to 0.357, and an increase in the collision count, from 13.75 to 13.9; hence, there is a need to selectively decide when to use EDCA mapping.

In our selected adaptation, we use two thresholds, collision count and utilization ratio, to decide when to use the EDCA period. Our current implementation uses a collision count threshold of 4 and the utilization ratio threshold is fixed at 0.3, as guided by previous simulations. In the case of twelve and sixteen nodes, the thresholds indicate that the load in the network is high and the adaptation policy does not use the EDCA mapping technique. When there are few nodes in EDCA, the adaptation is run every service interval, whereas for the cases of four and eight nodes, the adaptation is performed selectively; hence, the delay is higher than in the ADAPT_ALL cases in order to avoid significantly impacting flows in EDCA.

From the experiments above, we have shown that the adaptation framework is able to significantly decrease the delay experienced by VBR flows using two techniques, reallocation of time in HCCA and guided transmission in the EDCA period.

Comparison with Flexible HCF

In addition to comparing our work with the 802.11e reference scheduler, we have also compared the proposed algorithm with Flexible HCF (FHCF), proposed in the cited publication by Ansel et al. To perform this comparison with FHCF, we implemented the algorithm in the Opnet framework and considered a number of scenarios. We revisit the scenarios used in Table 3 and evaluate the performance of the FHCF algorithm. The experimental results, found in Table 6, show that the delay experienced by the VBR flow with FHCF is higher than with our adaptation. We believe this is due to the burstiness of the traffic flow, which can cause the FHCF algorithm to shrink the TXOP prematurely and cause higher delays. Especially in the case of Video1_4, FHCF is unable to reduce the delay below the tolerable threshold.

TABLE 6

Effect of Variability with FHCF

| | Data Rate (kb/s) | | Delay (ms) | | |
|---|---|---|---|---|---|
| Video Type | Mean | Std. Dev. | Without Adapt. | With Adapt. | With FHCF |
| Video1_1 | 387 | 140 | 1088 | 6 | 35 |
| Video1_2 | 416 | 197 | 733 | 10 | 58 |
| Video1_3 | 425 | 225 | 1029 | 97 | 121 |
| Video1_4 | 467 | 216 | 4640 | 118 | 414 |

TABLE 7

Comparison of Proposed Approach with FHCF

| No of Flows | Delay (ms) | | |
|---|---|---|---|
| | Without Adapt. | With Adapt. | With FHCF |
| 4 | 916 | 12 | 59 |
| 8 | 814 | 15 | 111 |
| 16 | 773 | 37 | 491 |

After looking at how one VBR flow fares with FHCF, in the next scenario, we vary the number of VBR flows between four and sixteen and use similar traffic profiles (Video1_2). We use the same traffic profiles for all flows in order to simulate the case when there is a high correlation between the demands of all the flows. The results are summarized in Table 7. In order to compare between FHCF and our adaptation, we consider these cases to highlight the differences and potential advantages between the two approaches. In case of four nodes, the time available in HCCA is sufficient to incorporate the variable requirements by both approaches; hence our proposed adaptation and FHCF are expected to have similar performance. However, we observe that our adaptation fares better than FHCF and this is potentially due to burstiness of the traffic flow as observed in the earlier result. In the case of eight nodes, the time available is limited and the AP has to fairly allocate the additional transmission opportunity. In order to achieve fairness, FHCF divides the remaining time evenly between the flows. However, the segmented transmission opportunities may not be sufficient for a flow to overcome traffic variability leading to higher delay as observed in the table. Alternatively, our proposed adaptation attempts to achieve fairness over a number of SIs using a round robin approach. In each SI, the algorithm selects a set of flows to poll and allocates additional time based on their reservation parameters. We believe this approach leads to an improved delay performance by our algorithm. Finally, in case of sixteen nodes, there is no time available in the HCCA period, hence, the FHCF flow is unable to use any of its mechanism to deal with the variability in the flows. Our proposed adaptation fairs better because of the additional opportunity to transmit in EDCA.

The next aspect we evaluate is the delay effects on other flows scheduled in HCCA period by the FHCF approach. For this evaluation, we observe a case with one VBR flow (Video1_VBR) and multiple CBR flows (Video2_CBR). The performance of the VBR flow improves similar to the previous simulations. However, for the CBR flows scheduled after the VBR node, we observe an increase of 10% in the average delay due to the adaptation.

Based on the above analysis, the 802.11e HCF scheduler by Prado in supporting real-time multimedia flows show several limitations. More specifically, the reference scheduler cannot adequately support multimedia flows with variable requirements or flows. Under variable flow requirements, the HCF scheduler can lead to high delay, severely impacting the real-time multimedia quality. Additionally, we observed that the HCF framework maps different flows to different modes of medium access with real-time flows being confined to polling-based mechanisms. The above separation can lead to poor channel utilization under heavy HCCA load.

The present dynamic adaptation monitors the status of each flow for variations in the flow requirements, dynamically associates traffic flows appropriately, configures a polling schedule to allow additional polls to the lagging flows, and selectively mapping real-time multimedia flows to EDCA mode of access under low load in EDCA. Our comparative evaluation demonstrates that the adaptation reduces the delay observed in the real-time flows, and fairs better than other known techniques in terms of delay, multimedia quality and capacity of the network.

In developing this adaptation framework, we observed that the variation in the traffic flows can significantly increase the delays and even the minimal variability in reservation can lead to high delays. Since the AP allocates time solely based on reservation requests, the accuracy of these requests is important in maintaining the desired QoS. Hence, in some application, the reservations should be used as a guideline, whereas additional resources should be allocated dynamically based on monitored requirements of a flow.

The above described implementations of the dynamic adaptation allow for (1) allocating additional time to a selected flow which has been previously assigned in HCCA, and (2) assigning a selected node which has been previously assigned to communicate with the access point in the HCCA period and has completed assigned communication with the access point in HCCA, after the HCCA period terminates, to continue communicating with the access point in the EDCA period in contention with other nodes. In addition, the dynamic adaptation may also be implemented to assign a communication flow in EDCA a time period in HCCA under certain circumstances to reduce the over all delay when the EDCA load is too high.

FIG. 11A illustrates one example of this feature where a communication flow initially assigned in EDCA is reassigned to an available time period in HCCA. Hence, a contention-free time period in the HCCA period is allocated to a selected node, which has been previously assigned to communicate with the access point in the EDCA period, to communicate with the access point when there is unused time left in the HCCA period after nodes previously assigned to the HCCA period have been served.

With this feature, the dynamic adaptation allows for full utilization of the communication capacities in both HCCA and EDCA to enhance the QoS. For example, although non-real-time traffic may be ordinarily assigned to the EDCA period, such traffic is not necessarily limited to EDCA and, when needed, can be reassigned to the HCCA. In the scenario where there are limited flows being serviced in HCCA, it is advantageous to schedule other flows in the network based on their priority and queue buildup. By using the time allocated in HCCA efficiently, we can improve the experienced delay and throughput of nodes in EDCA. To illustrate this limitation, we consider a scenario of multiple flows, four pre-scheduled in HCCA and ten flows in EDCA. FIG. 11B illustrates the throughput achieved by a prioritized EDCA flow with traffic characteristics of 400 kb/s. Note that despite its traffic class priority and available slack in HCCA, the EDCA flow experiences low throughput due to the high load in EDCA. However, by dynamically deciding to allow the EDCA flow to transmit during HCCA, based on the queue buildup and priority of the EDCA flow, we demonstrate that we can increase the EDCA flow throughput without affecting other flows in the network.

In order to evaluate the algorithm performance for EDCA flows, we consider a scenario, SCENARIO4, where the number of CBR traffic flows scheduled in HCCA is fixed at four and the number of EDCA traffic flows is fixed at ten. For this scenario, there is time remaining within the HCCA flow to be allocated to EDCA traffic flows. Due to high network load, the EDCA traffic flows can suffer from a queue buildup leading to a large decrease in throughput and increase in delay. Hence, EDCA flow allocation in the HCCA period can be effective under high EDCA load. FIG. 11C shows the achieved throughput of a high-priority EDCA flow with and without adaptation. Note that our proposed EDCA adaptation is able to outperform the throughput achieved with the original HCF allocation.

Other enhancements and variations to the present dynamic adaptation may be possible. For example, the EDCA load estimation can be generalized and enhanced to consider the impact of mapping a particular flow to the EDCA period. Rather than assume that each flow has a similar impact on the EDCA period, we plan to understand the impact of a flow based on its traffic profile. In addition, we would like to enhance our HCCA reallocation scheme to include the option of extending the allocated transmission time for the additional polls. Further possible extensions include the demonstration of the framework on various video and other real-time flows, developing model-based scheduling enhancements, and incorporating mobility and channel conditions in future versions of our adaptation scheme.

Beyond the presented framework, for future work, we would like to understand the implications of misbehaving nodes in WLAN networks and develop resource management policies to deal with such nodes. Another area of interest is providing an admission control policy to understand the tradeoff between improving capacity of the network, while providing a guarantee of QoS. In addition to delay as a QoS metric, we believe that the impact of QoS provisioning techniques on energy consumption needs to be addressed. Finally, we plan to implement the above framework and demonstrate the adaptation in an actual WLAN testbed.

In implementations, the above described techniques and their variations may be implemented as computer software instructions or firmware instructions. Such instructions may be stored in an article with one or more machine-readable storage media or stored in one or more machine-readable storage devices connected to one or more computers or digital processors such as digital signal processors and microprocessors. In operation, the instructions are executed by one or more processors to cause the machine to perform the described functions and operations.

Only a few implementations are described. However, other variations and enhancements are possible based on what is described here.

What is claimed is:

1. A method for controlling communications in a wireless local area network (WLAN) having an access point as a communication portal and a plurality of wireless communication nodes each wirelessly communicating with the access point, comprising:

operating the access point to receive information about communication flows from the nodes;

assigning (1) selected nodes, based on nature of communication flows with the selected nodes, with contention-free time periods to allow each selected node to communicate with the access point without contention with other nodes in a corresponding contention-free time period, and (2) remaining nodes to contend with each other in a time period outside the contention-free time periods and to communicate with the access point;

after the assigning, monitoring communication delay buildup in each of the nodes during communications in assigned time periods to determine whether additional time is needed;

allocating additional contention-free time to a node needing the additional time when such additional contention-free time is available; and when the additional contention-free time is not available, directing the selected node to contend with other nodes in communicating with the access point.

2. The method as in claim 1, further comprising:

monitoring communication delay buildup in each selected node during a corresponding contention-free period to determine whether an additional contention-free time period is needed;

when there is additional time in assigned contention-free communication with the access point after the selected nodes communicate with the access point, allocating an additional contention-free time period to the node originally assigned to contention-free access needing additional time; and when the additional contention-free time is not available, allowing the selected node to contend with other nodes communication with the access point.

3. The method as in claim 2, further comprising:

selecting a node that communicates a real-time communication flow with the access point as one of the selected nodes to communicate the real-time communication flow with the access point without contention with other nodes; and at an end of an assigned contention-free time period for the node, allowing the node to contend with other nodes to continue communication of the real-time communication flow with the access point.

4. The method as in claim 1, further comprising:

monitoring a communication delay buildup in each node that is not selected to assign a contention-free time period to communicate with the access point and is assigned to contend with other nodes in communicating with the access point;

when there is additional time left in assigned contention-free communication with the access point after the selected nodes communicate with the access point, reassigning a node, which has been assigned to contend with others in communicating with the access point, with a contention-free time period to communicate with the access point without contention with other nodes.

5. The method as in claim 4, wherein the node that has been assigned to contend with others in communicating with the access point but is reassigned with a contention-free time period to communicate with the access point without contention with other nodes communicates a non real-time communication flow with the access point.

6. The method as in claim 1, wherein the WLAN is in compliance with IEEE 802.11e to support polling-based contention-free communications with the access point under Hybrid Coordination Function Controlled Channel Access (HCCA) and prioritized contention-based Enhanced Distributed Channel Access (EDCA); and wherein each service interval is divided into (1) an HCCA period during which the selected nodes are polled by the access point and are assigned with the contention-free time periods in communicating with the access point and (2) a separate EDCA period during which other nodes that are not selected to communicate with the access point in the HCCA period contend with one another to communicate with the access point based on assigned access categories.

7. The method as in claim 1, further comprising:
monitoring a level of traffic load at the access point for nodes that contend for communication with the access point; and
directing the selected node to contend with other nodes in communicating with the access point when the traffic load permits.

8. The method as in claim 1, further comprising:
monitoring an aggregated communication delay buildup in the nodes; and
dividing the nodes into the selected nodes for contention-free communication with the access point and the remaining nodes for contention-based communication with the access point to reduce the aggregated communication delay buildup.

9. The method as in claim 1, further comprising assigning nodes with priority-based access categories to contend with each other in a time period outside the contention-free time periods and allowing each node to communicate with the access point based on a priority of an assigned priority-based access category.

10. A method for controlling communications in a wireless local area network (WLAN) in compliance with IEEE 802.11e to support polling-based contention-free communications with an access point of the WLAN according to Hybrid Coordination Function Controlled Channel Access (HCCA) and prioritized contention-based Enhanced Distributed Channel Access (EDCA), comprising:

dividing each service interval for communicating with the access point into (1) an HCCA period during which a wireless communication node allocated to communicate with the access point is assigned with a contention-free time period to communicate with the access point without contention of other nodes and (2) a separate EDCA period during which a wireless communication node contends with other nodes to communicate with the access point based on assigned access categories;
monitoring a communication delay at each node in communication with the access point;
monitoring a traffic load at the access point for communications with nodes in the EDCA period; and
dynamically controlling access of nodes to the access point according to the monitored communication delays of nodes and the monitored traffic load, wherein the dynamic control comprises at least one of
(1) allocating additional time to a selected node which has been previously assigned to communicate with the access point in the HCCA period,
(2) assigning a selected node which has been previously assigned to communicate with the access point in the HCCA period and has completed assigned communication with the access point in HCCA, after the HCCA period terminates, to continue communicating with the access point in the EDCA period in contention with other nodes, and
(3) allocating a contention-free time period in the HCCA period to a selected node, which has been previously assigned to communicate with the access point in the EDCA period, to communicate with the access point when there is unused time left in the HCCA period after nodes previously assigned to the HCCA period have been served.

11. The method as in claim 10, wherein the dynamic control is performed in a way which reduces an aggregated utility value of packet delays in the nodes of the WLAN in accessing the access point.

12. The method as in claim 10, wherein the monitoring of the communication delay at each node comprises monitoring the length of a residual queue of each node.

13. The method as in claim 10, wherein the monitoring of the traffic load at the access point for communications with nodes in the EDCA period comprises monitoring a collision count of different nodes in communicating with the access point during the EDCA period.

14. The method as in claim 10, wherein the monitoring of the traffic load at the access point for communications with nodes in the EDCA period comprises monitoring a utilization ratio during the EDCA period.

15. The method as in claim 10, wherein the assigning of a selected node which has been previously assigned to communicate with the access point in the HCCA period, after the HCCA period terminates, to continue communicating with the access point in the EDCA period in contention with other nodes is made when the traffic load during the EDCA period is below a threshold.

16. The method as in claim 10, wherein the assigning of a selected node which has been previously assigned to communicate with the access point in the HCCA period, after the HCCA period terminates, to continue communicating with the access point in the EDCA period in contention with other nodes is made when there is no time left in the HCCA period to give the selected node additional time to communicate with the access point.

17. The method as in claim 10, wherein, in the allocating of additional time to a selected node which has been previously assigned to communicate with the access point in the HCCA period, the additional time is allocated in the HCCA period after other nodes which have been previously assigned to communicate with the access point in the HCCA period are served.

18. A system for controlling communications between wireless communication nodes and an access point in a wireless local area network under IEEE 802.11e to support polling-based contention-free communications between nodes and the access point according to Hybrid Coordination Function Controlled Channel Access (HCCA) and prioritized contention-based Enhanced Distributed Channel Access (EDCA), comprising:

a monitoring module having an HCCA monitor which monitors HCCA communication flows to produce HCCA measurements and an EDCA monitor which monitors EDCA communication flows to produce EDCA measurements; and an adaptor module, in response to the HCCA measurements and the EDCA measurements, operating to dynamically control communications of nodes with the access point in both HCCA and EDCA to reduce an aggregated communication delay caused by delays of individual nodes.

19. The system as in claim 18, wherein the adaptor module operates to allocate additional time in HCCA to a selected node which has been previously assigned to communicate with the access point in HCCA.

20. The system as in claim 18, wherein the adaptor module operates to assign a selected node, which has been previously assigned to communicate with the access point in HCCA and has completed assigned communication with the access point in HCCA, to continue communicating with the access point in EDCA in contention with other nodes.

21. The system as in claim 18, wherein the adaptor module operates to allocate a contention-free time period in HCCA to a selected node, which has been previously assigned to communicate with the access point in EDCA, to communicate with the access point when there is unused time left in HCCA after nodes previously assigned to HCCA have been served.

22. The system as in claim 18, wherein the HCCA measurements comprise HCCA flow statistics weights based on mean residual queue sizes and residual queue variances of communication flows, and a Hybrid Coordination Function (HCF) slack.

23. The system as in claim 18, wherein the EDCA measurements comprise EDCA flow statistics weights based on mean residual queue sizes and data rates of communication flows, and a utilization factor and a collision factor in EDCA.

\* \* \* \* \*

UNITED STATES PATENT AND TRADEMARK OFFICE
CERTIFICATE OF CORRECTION

PATENT NO. : 7,808,941 B2  Page 1 of 1
APPLICATION NO. : 11/718323
DATED : October 5, 2010
INVENTOR(S) : Naomi Ramos, Debashis Panigrahi and Sujit Dey It is certified that error appears in the above-identified patent and that said Letters Patent is hereby corrected as shown below:

Title Page, Item (56) on Page 2, under "OTHER PUBLICATIONS", in Column 2, Line 35, please delete "Wiethöler," and insert -- Wiethölter, --, therefor.

Title Page, Item (56) on Page 2, under "OTHER PUBLICATIONS", in Column 2, Line 36, please delete "Simualtion" and insert -- Simulation --, therefor.

In Column 3, Line 37, please delete "ECCA" and insert -- EDCA --, therefor.

In Column 15, Line 25, please delete "802.111e" and insert -- 802.11e --, therefor.

Signed and Sealed this
Twenty-sixth Day of April, 2011

David J. Kappos
*Director of the United States Patent and Trademark Office*